(12) United States Patent
Pavillard et al.

(10) Patent No.: US 6,284,978 B1
(45) Date of Patent: Sep. 4, 2001

(54) CABLE MANAGEMENT FOR SYSTEM PERIPHERAL DEVICE

(75) Inventors: Denis Pavillard, Redwood City, CA (US); Sergio Lazzarotto, Neuchatel (CH); Keith Tritschler, Dublin (IE)

(73) Assignee: Logitech, Inc., Fremont, CA (US)

( * ) Notice: Subject to any disclaimer, the term of this patent is extended or adjusted under 35 U.S.C. 154(b) by 0 days.

(21) Appl. No.: 09/335,385

(22) Filed: Jun. 17, 1999

(51) Int. Cl.$^7$ .............................. H02G 3/04; G06F 1/16
(52) U.S. Cl. ................................. 174/97; 361/683
(58) Field of Search ..................... 361/683; 174/97; 439/502

(56) References Cited

U.S. PATENT DOCUMENTS 4,684,185 * 8/1987 Arney et al. ................... 439/502
5,844,775 12/1998 Lundberg ..................... 361/683

FOREIGN PATENT DOCUMENTS 4-54513    12/1987  (JP) .
2582333    6/1994   (JP) .

* cited by examiner

Primary Examiner—Shawn Riley
(74) Attorney, Agent, or Firm—Townsend and Townsend and Crew LLP

(57) ABSTRACT

A keyboard includes a Universal Serial Bus hub having at least one downstream port each for connecting with a connector coupled to a cable of a downstream system peripheral device. The keyboard includes a cable receiving channel for receiving at least a portion of the cable of the downstream system peripheral device. The cable receiving channel is an open channel disposed in the bottom surface of the keyboard. The cable receiving channel has sufficient length and depth for receiving a substantial portion of the cable. The cable receiving channel includes a plurality of paths of varying lengths selectable for receiving different lengths of the cable into the channel to adjust the cable slack. The cable can be stacked to overlap in portions of the channel to increase the amount of the cable received in the channel and to reduce the cable slack.

26 Claims, 4 Drawing Sheets

CABLE MANAGEMENT FOR SYSTEM PERIPHERAL DEVICE

BACKGROUND OF THE INVENTION

This invention relates generally to system peripherals and, more particularly, to managing cables for system peripherals to prevent entanglement and to conveniently adjust the slack of the cables.

A variety of system peripherals are widely used to provide interface with a system host such as a personal computer. Among the most common input peripherals include computer mouse devices, keyboards, and joysticks, while printers, monitors, and speakers are examples of output peripherals. Conventional interfaces between the system host and system peripherals such as PS/2 interface and parallel ports can be cumbersome and difficult to use. Conventional interfaces also place severe restrictions on the number of peripherals that can be connected to the system host.

A more robust interface standard known as the Universal Serial Bus (USB) has been developed for providing interface among devices such as the integration of many peripherals to a system host. For example, the USB in a personal computer system connects computer peripherals to a personal computer through a single connector type using a tiered-star topology. A host controller of the USB interfaces with the host processor inside the personal computer. The host controller controls all accesses to USB resources and monitors the bus's topology. The USB has a "hot-swapping" feature that allows the user to attach or remove a peripheral without the need to shut down and restart the system host.

A USB hub provides USB attachment points for USB devices, as shown in FIG. 1. The USB hub includes a hub controller coupled to a hub repeater which is coupled to an upstream port or root port (port 0) for connection to a system host. The hub repeater is coupled to N number of downstream ports providing connection for N number of downstream USB-compatible devices. The USB hub is responsible for transferring data both upstream and downstream. All data transfers occur between the host computer and the peripheral devices.

The host controller includes a root hub, but a USB system may include other hubs that provide easy plug-in points for peripheral devices. This permits the user to "daisychain" multiple devices together to form a system interface tree, as illustrated in FIG. 2. The host is at the root of the system interface tree, while the peripheral devices are located on branches of the tree. A system interface such as a USB hub resides at each intersection. In the embodiment shown, the hubs are conveniently built into the peripheral devices. Each system interface hub has one or more downstream ports providing connection for one or more downstream peripherals. When the host transfers data to a device, data is transferred downstream through all hubs, from an upstream port to all non-disabled downstream ports to all other hubs and devices. On the other hand, when data is transferred from a device to the host, the transfer occurs upstream only on the direct path to the host. The USB also distributes electrical power to the peripherals by letting the system host sense automatically the power that is required and deliver it to low-power peripheral devices. External power supplies are needed only for high power peripheral devices.

SUMMARY OF THE INVENTION

With the proliferation of branches in the system interface tree for interfacing more and more peripherals and devices together, there is an increasing need to manage the cables that connect the devices to prevent entanglement and to allow adjustment of the slack of the cables. For instance, excess cable can be unsightly and a nuisance when exposed, particularly on desk tops. Excess cable slack can even pose a hazard.

The present invention provides a cable management scheme for managing excess cables between the devices by providing cable receiving channels, cable holders or other cable management members for accommodating the excess cables. Specific embodiments of the invention arrange a cable receiving member near the system interface in a device to accommodate cables for connecting other devices to the system interface of the subject device. The system interface is desirably a built-in interface such as a USB hub. The amount of excess cable taken by the cable receiving member is adjustable so that the amount of cable slack can be conveniently and easily changed by the user. The cable receiving member is desirably disposed in an area that is normally out of sight for aesthetic purposes.

In accordance with an aspect of the present invention, a system peripheral device comprises a system interface including at least one downstream port each for connecting with a connector coupled to a cable of a downstream system peripheral device. The system peripheral device has a cable holder for holding at least a portion of the cable of the downstream system peripheral device. The cable holder is capable of holding a substantial portion of the cable of the downstream system peripheral device. In one embodiment, the cable holder comprises at least one open channel having a serpentine arrangement. The channel has a plurality of paths of different lengths. The length of the cable received by the channel is determined by the length of the path of the channel selected to receive the cable. The length of the cable received by the channel can also be varied by adjusting the stacking of multiple portions of the cable to overlap in at least part of the channel. The system interface in a specific embodiment is a Universal Serial Bus hub.

In accordance with another aspect of the invention, a system peripheral device comprises system interface means for interfacing with at least one downstream system peripheral device. At least one port is provided for connecting with a cable of each of at least one downstream system peripheral device. The system peripheral device further comprises cable management means for receiving at least a portion of the cable of at least one downstream system peripheral device up to a substantial portion of the cable of the downstream system peripheral device.

In accordance with another aspect of the present invention, a keyboard comprises a system interface including at least one downstream port each for connecting with a connector coupled to a cable of a downstream system peripheral device. A cable receiving channel is provided for receiving at least a portion of the cable of the downstream system peripheral device. The cable receiving channel has sufficient length and depth for receiving a substantial portion of the cable of the downstream system peripheral device. In one embodiment, the cable receiving channel is furcated into multiple branches including at least one branch terminating at a channel exit on generally the left side of the keyboard and at least one branch terminating at a channel exit on generally the right side of the keyboard. In a specific embodiment, the system interface includes a downstream port recessed from the side edges of the keyboard so that the connector of the downstream system peripheral device connected with the downstream port does not protrude substantially beyond the side edges of the keyboard. The cable receiving channel includes a turn changing direction of the cable receiving channel in a generally opposite manner.

In accordance with yet another embodiment of this invention, a combination of system devices comprises a first system device including a system interface hub and a second system device. A cable connects the second system device to the system interface hub of the first system device. At least one of the first system device and the second system device includes a cable receiving member for receiving at least a portion of the cable. The cable receiving member is capable of receiving a substantial portion of the cable.

BRIEF DESCRIPTION OF THE DRAWINGS

The preferred embodiments of this invention, illustrating all their features, will now be discussed in detail. These embodiments depict the novel and nonobvious system peripheral cable management method and apparatus of this invention shown in the accompanying drawings, which are included for illustrative purposes only. These drawings include the following figures, with like numerals indicating like parts.

DESCRIPTION OF THE SPECIFIC EMBODIMENTS

Figure 1:
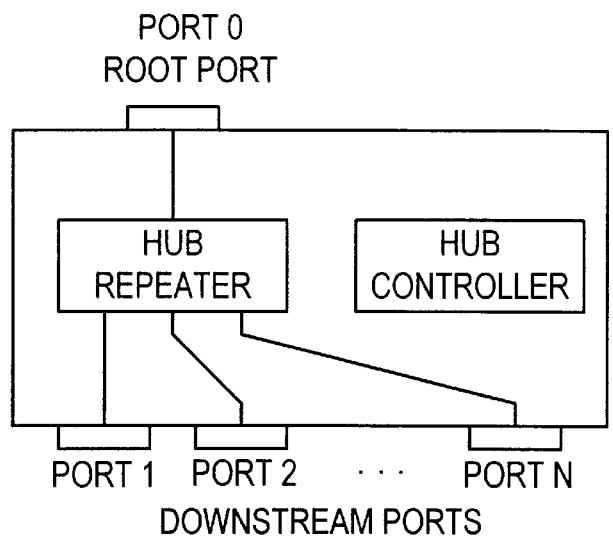
FIG. 1 is a schematic view of a Universal Serial Bus hub in accordance with an embodiment of the invention.
Figure 2:
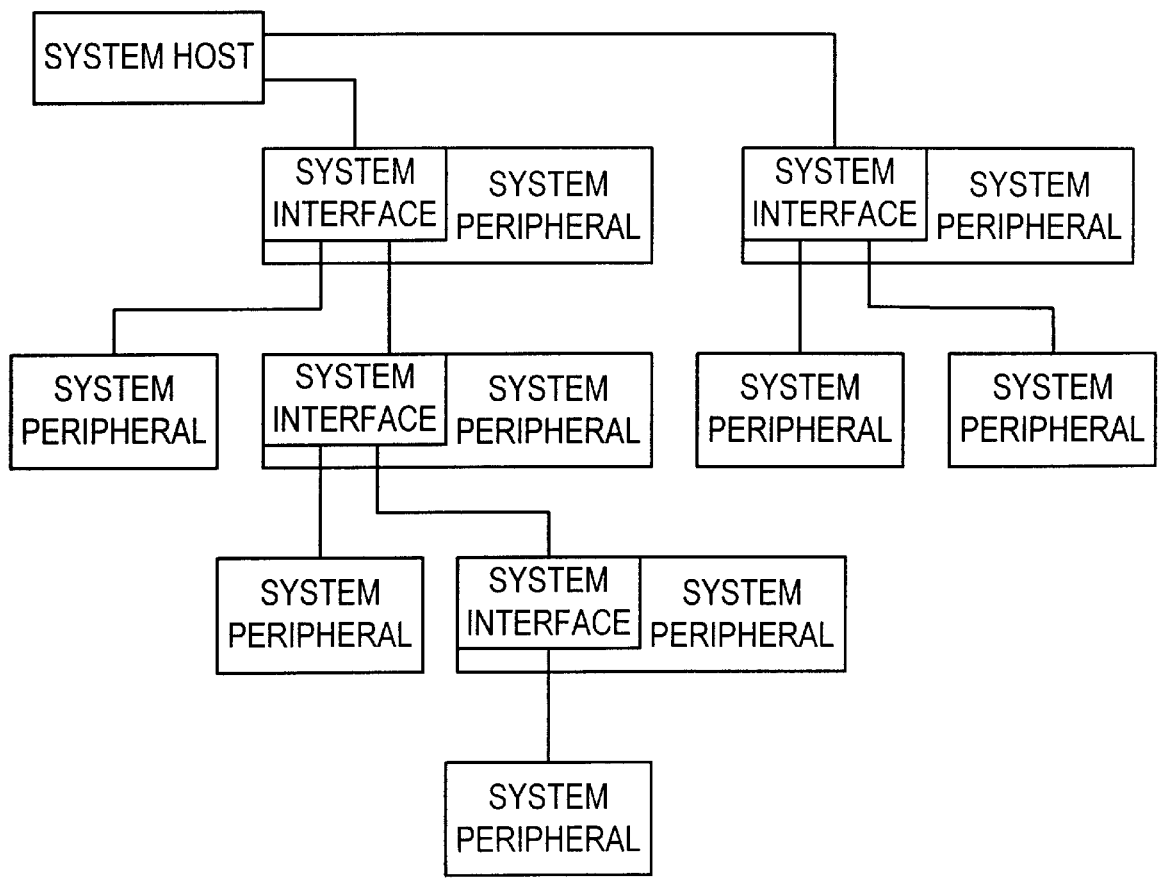
FIG. 2 is a schematic diagram of a system interface tree.
Figure 3:
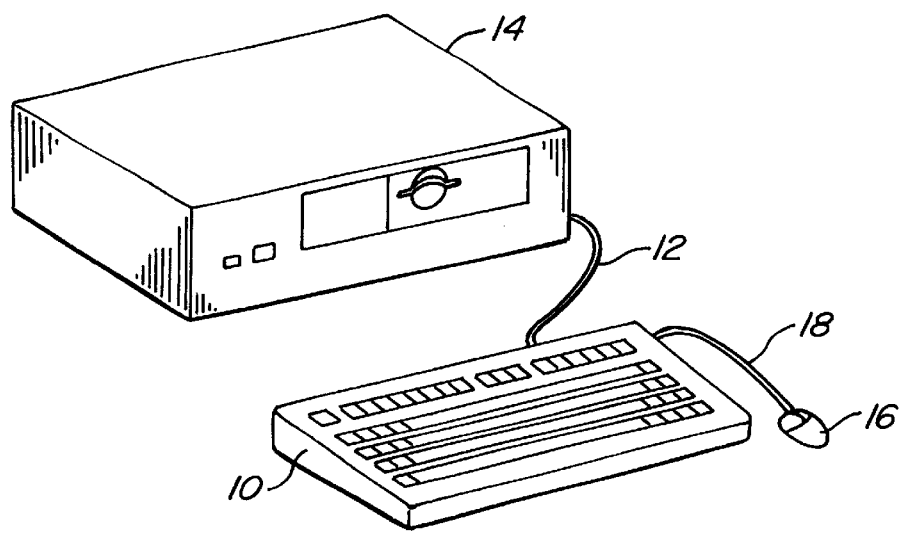
FIG. 3 is a perspective view schematically illustrating a keyboard connected to a system host and a mouse connected to the keyboard.
Figure 4:
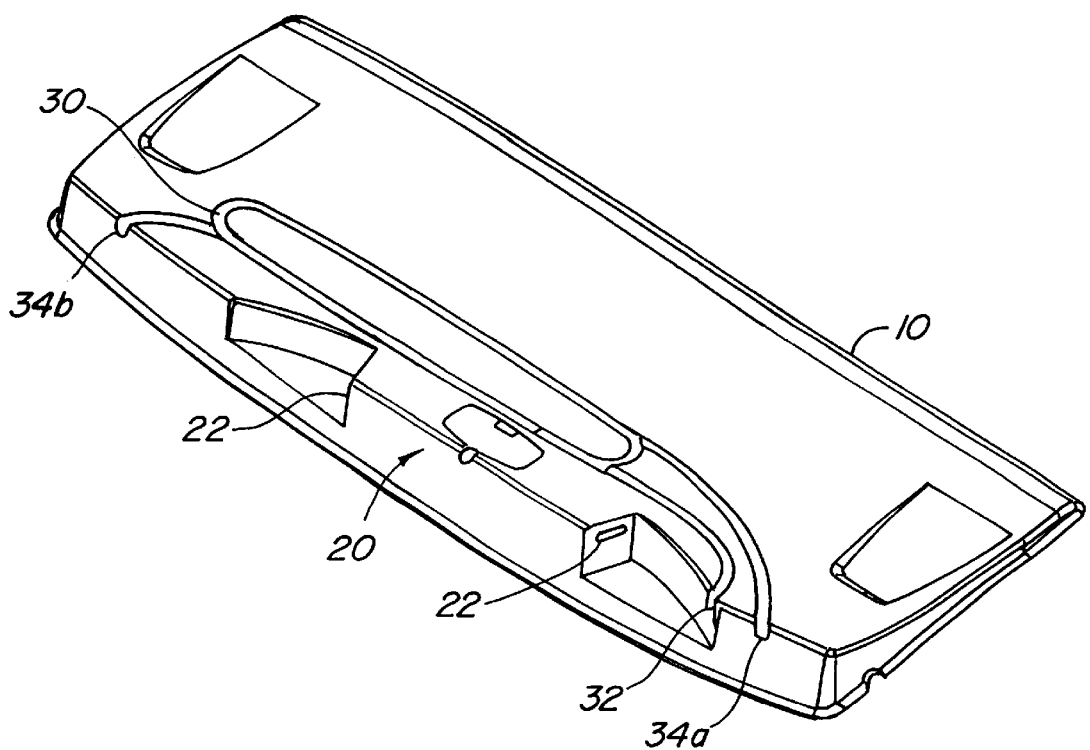
FIG. 4 is a perspective view of the bottom of the keyboard of FIG. 3 schematically illustrating the cable management apparatus in accordance with an embodiment of the invention.
Figure 5:
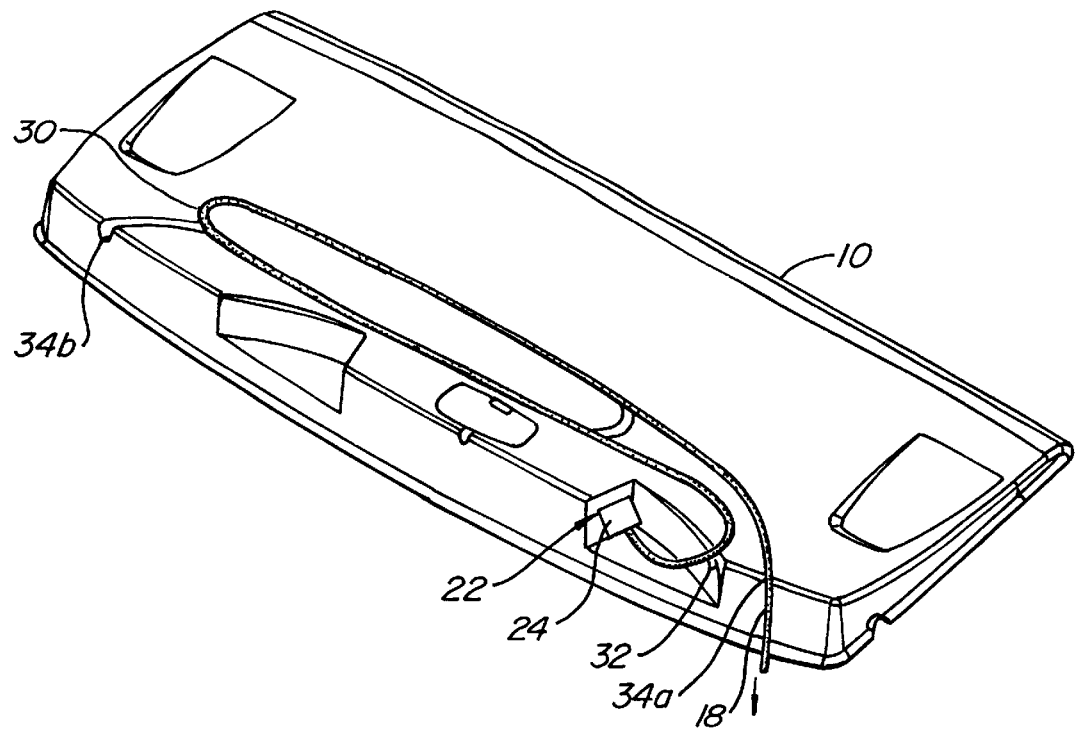
FIG. 5 is a perspective view of the bottom of the keyboard of FIG. 4 with the mouse cable arranged to extend from the right side of the keyboard.

FIG. 3 shows a keyboard 10 connected via a keyboard cable 12 to a system host 14 such as a micro-controller for a personal computer. A computer mouse 16 is connected to the keyboard 10 via a mouse cable 18. As best seen in FIG. 4, the keyboard 10 includes a system interface 20 such as a USB hub which desirably is conveniently built into the housing of the keyboard 10. The USB hub 20 includes a pair of downstream ports 22 to provide connections for downstream peripherals. One downstream peripheral in the form of the mouse 16 is connected to one of the downstream ports 22 via a connector 24 coupled at the end of the mouse cable 18, as best seen in FIGS. 3 and 5. The keyboard 10 is an example of one of the system peripherals in the system interface tree shown in FIG. 2 having a system interface for connecting to downstream peripherals, while the mouse 16 is an example of one of the system peripherals located at the ends of the branches with no downstream connection interface.

The mouse cable 18 is typically long. Because the connection port 22 for the mouse 16 is located on the keyboard 10 rather than on the system host 14, there will likely be a substantial amount of excess mouse cable 18 which is not necessary and may even be a nuisance or hazard when exposed. In the embodiment shown in FIGS. 3–5, a portion of the mouse cable 18 is received into a cable receiving channel 30 provided in the bottom surface of the keyboard 10.

The channel 30 of FIGS. 4 and 5 has a serpentine arrangement but it may have other shapes as well. The serpentine arrangement includes relatively gentle turns so that the user may arrange the cable 18 easily in the channel 30 in a manner to avoid sharp turns that may damage the mouse cable 18. The channel 30 includes turns that change the direction of the mouse cable 18 in a generally opposite manner, which reduces accidental disconnection of the connector 24 of the mouse cable 18 from the downstream port 22 by unintentional pulling of the mouse cable 18 because any pulling forces will be largely dissipated or absorbed by the walls along the sides of the channel 30 instead of reaching the connector 24.

The channel 30 is advantageously an open channel so that the mouse cable 18 can be easily placed in and taken out of the channel 30. In the embodiment shown in FIG. 4, the channel 30 is open toward the bottom of the keyboard 10. The channel 30 desirably is capable of receiving a substantial portion, more desirably up to the entire length, of the mouse cable 18. In some embodiments, the channel 30 may have a sufficient length to receive up to the entire length of the mouse cable 18. In other embodiments, the channel 30 may have a deep channel portion having a sufficient depth for stacking or overlapping multiple portions of the mouse cable 18 therein to receive up to the entire length of the mouse cable 18.

The channel 30 is desirably furcated into multiple branches, some of which terminate at open ends. FIG. 4 shows a channel entrance 32 near one of the downstream ports 22, a channel exit 34a near the right side of the keyboard 10, and a channel exit 34b near the left side of the keyboard 10. The cable 18 of the downstream peripheral extends from the downstream port 22, enters the channel 30 at the channel entrance 32, and exits the channel 30 at one of the channel exits 34a, 34b. The channel exits 34a, 34b provide different locations for positioning the downstream peripherals with respect to the keyboard 10.

Figure 6:
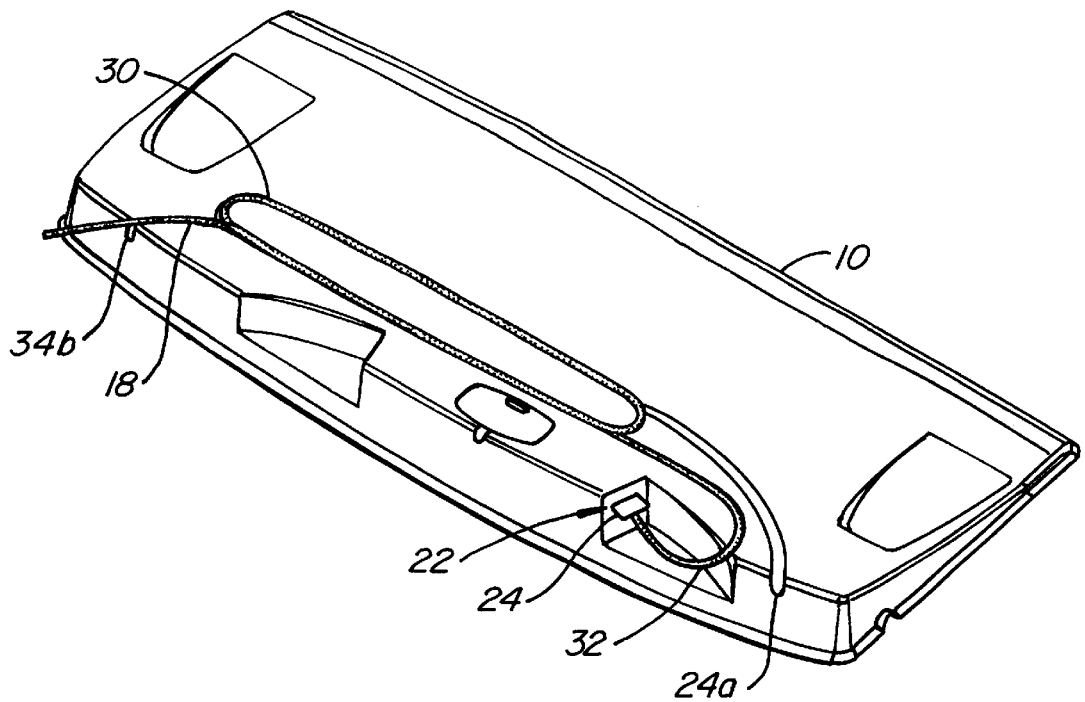
FIG. 6 is a perspective view of the bottom of the keyboard of FIG. 4 with the mouse cable arranged to extend from the left side of the keyboard.

To permit adjustment of the slack of the mouse cable 18, the channel 30 typically includes a plurality of paths of different lengths which can be selected for accommodating different lengths of the mouse cable 18, as shown in FIG. 4. For example, FIGS. 5 and 6 show two arrangements of the mouse cable 18 occupying different paths of the channel 30. In particular, the cable 18 in FIG. 5 exits the channel 30 at the right channel exit 34a typically for a right-handed user, while the cable 18 in FIG. 6 exits the channel 30 at the left channel exit 34b typically for a left-handed user. Because the path in the channel 30 taken by the cable 18 in FIG. 6 is longer than that in FIG. 5, the cable 18 in FIG. 5 has more slack than that in FIG. 6.

Figure 5A:
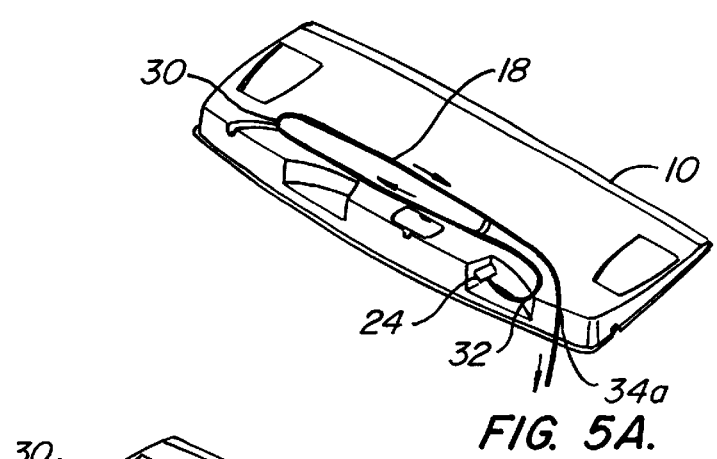
FIG. 5a is a perspective view of the bottom of the keyboard of FIG. 5 illustrating the arrangement of the mouse cable without stacking.
Figure 5B:
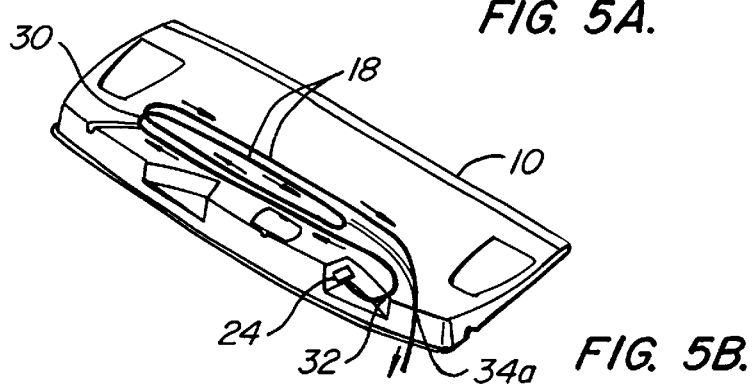
FIG. 5b is a perspective view of the bottom of the keyboard of FIG. 5 illustrating the arrangement of the mouse cable with stacking.
Figure 6A:
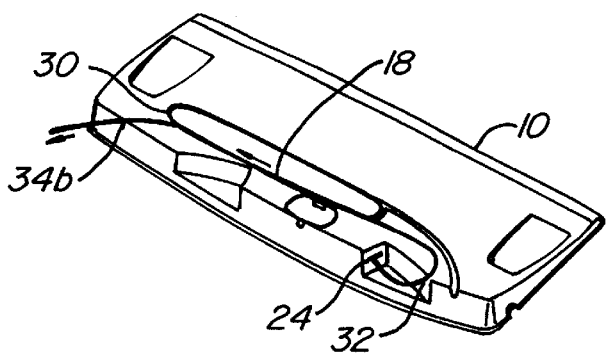
FIG. 6a is a perspective view of the bottom of the keyboard of FIG. 6 illustrating the arrangement of the mouse cable with stacking in one branch.
Figure 6B:
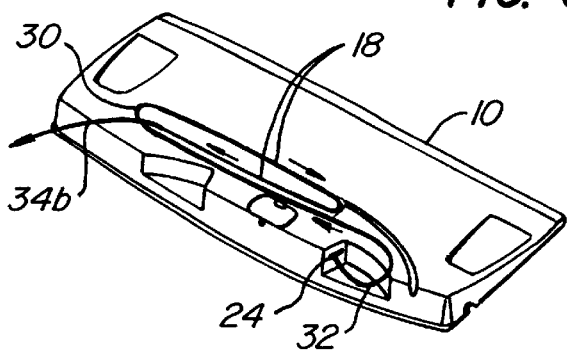
FIG. 6b is a perspective view of the bottom of the keyboard of FIG. 6 illustrating the arrangement of the mouse cable with stacking in multiple branches.

In addition to selecting paths having different lengths to adjust the slack of the cable 18, stacking of the cable 18 in the channel 30 can also be used to achieve a change in the amount of slack. For instance, the cable 18 in FIG. 5 is not stacked, as best seen in FIG. 5a, while the cable 18 in FIG. 6 is stacked along one branch of the channel 30, as best seen in FIG. 6a. The stacking in FIG. 6a results in a reduction of the slack. FIG. 5b illustrates the use of stacking along a substantial portion of the path occupied by the unstacked cable in FIG. 5a to increase the length of the cable 18 received in the channel 30. Similarly, FIG. 6b shows the effect of an increase in stacking along multiple branches of the channel 30 to further reduce slack of the cable 18. Therefore, the slack is conveniently adjustable both by selecting the desired path in the channel 30 and by varying the number of times the cable 18 is stacked in the channel 30.

As shown in FIGS. 4–6, the USB hub 20 and downstream ports 22 are advantageously disposed near the rear side edge of the keyboard 10 to minimize exposure of the mouse cable 18 toward the front of the keyboard 10 where it may interfere with the movement of the hands of the user. The USB hub 20 desirably includes a plurality of downstream ports 22 that are oriented in different directions to provide different orientation for and different ways of arranging the mouse cable 18 and the mouse 16. The downstream ports 22 are desirably recessed from the side edges of the keyboard 10 so that the connector 24 of the mouse cable 18 connected with the downstream port 22 does not protrude substantially beyond the side edges of the keyboard 10, thereby minimizing exposure of the connector 24 and the mouse cable 18.

The above-described arrangements of apparatus and methods are merely illustrative of applications of the principles of this invention and many other embodiments and modifications may be made without departing from the spirit and scope of the invention as defined in the claims. For instance, other system peripherals may be provided with cable receiving members such as channels for managing cables. In another embodiment, a flat-screen monitor includes a system interface such as a USB hub with multiple downstream ports and has a plurality of channels in the rear. A speaker is connected to a downstream port via a connector at the end of a speaker cable. A portion of the speaker cable is received into one of the channels. In addition, while the channel 30 in FIG. 4 includes multiple branches that are interconnected, an alternate embodiment may include multiple independent channels that are not interconnected. Furthermore, although channels are shown for receiving cables, other cable management members such as hooks and clips may be used to accommodate the cables. The scope of the invention should, therefore, be determined not with reference to the above description, but instead should be determined with reference to the appended claims along with their full scope of equivalents.

What is claimed is:

1. A system peripheral device comprising:
   a cable holder for holding at least a portion of a cable of, the cable holder capable of holding a substantial portion of the cable of the downstream system peripheral device, wherein the cable holder comprises at least one channel including a deep channel portion having a sufficient depth for stacking multiple portions of the cable therein, and wherein the length of the cable of the downstream system peripheral device received by the at least one channel is variable by adjusting the stacking of the cable in the deep channel portion.

2. The system peripheral device of claim 1 wherein the cable holder is capable of holding substantially all of the cable.

3. The system peripheral device of claim 1 further comprising a system interface including at least one downstream port, each downstream port for connecting with a connector coupled to a cable of a downstream system peripheral device.

4. The system peripheral device of claim 1 wherein the at least one channel has a serpentine arrangement.

5. The system peripheral device of claim 1 wherein the at least one channel has a plurality of paths of different lengths, and wherein the length of the cable received by the at least one channel is determined by the length of the path of the at least one channel selected to receive the cable.

6. The system peripheral device of claim 3 wherein the system interface includes a plurality of downstream ports each for connecting with a cable of each of the at least one downstream system peripheral devices, the ports being oriented in difference directions.

7. The system peripheral device of claim 1 wherein the at least one channel includes a plurality of channel branches, at least some of the plurality of channel branches terminating at channel exits.

8. The system peripheral device of claim 1 wherein the at least one channel comprises an open channel.

9. The system peripheral device of claim 3 wherein the system interface includes a plurality of downstream ports.

10. The system peripheral device of claim 3 wherein the system interface comprises a Universal Serial Bus hub.

11. A system peripheral device comprising:
    system interface means for interfacing with at least one downstream system peripheral device;
    a plurality of ports each for connecting with a cable of each of the at least one downstream system peripheral device, the ports being oriented in different directions; and
    cable management means for receiving at least a portion of the cable of the at least one downstream system peripheral device up to a substantial portion of the cable of the downstream system peripheral device.

12. The system peripheral device of claim 11 wherein the cable management means comprises at least one channel including a deep channel portion having a sufficient depth for stacking multiple portions of the cable therein, and wherein the length of the cable of the downstream system peripheral device received by the at least one channel is variable by adjusting the stacking of the cable in the deep channel portion.

13. The system peripheral device of claim 11 further comprising a device connector for coupling the system peripheral device to a downstream port of a system interface of an upstream system peripheral device.

14. The system peripheral device of claim 11 further comprising a device connector for coupling the system peripheral device to a port of a system host.

15. A keyboard comprising:
    a cable receiving channel for receiving at least a portion of the cable of the downstream system peripheral device, the cable receiving channel having sufficient length and depth for receiving a substantial portion of the cable of the downstream system peripheral device, wherein the cable receiving channel includes a plurality of paths of varying lengths selectable for receiving different lengths of the cable of the downstream system peripheral device into the cable receiving channel.

16. The keyboard of claim 15 further comprising a system interface including at least one downstream port, each downstream port for connecting with a connector coupled to a cable of a downstream system peripheral device.

17. The keyboard of claim 15 wherein the cable receiving channel includes a deep channel portion having a sufficient depth for stacking multiple portions of the cable, and wherein the length of the cable received into the cable receiving channel is variable by selecting the amount of the stacking of the cable received into the deep channel portion.

18. The keyboard of claim 15 wherein the cable receiving channel comprises an open channel disposed in the bottom surface of the keyboard.

19. The keyboard of claim 18 wherein the cable receiving channel is furcated into multiple branches including at least one branch terminating at a channel exit on generally the left side of the keyboard and at least one branch terminating at a channel exit on generally the right side of the keyboard.

20. The keyboard of claim 16 wherein the system interface includes a downstream port recessed from side edges of the keyboard so that the connector of the downstream system peripheral device connected with the downstream port does not protrude substantially beyond the side edges of the keyboard.

21. The keyboard of claim 16 wherein the at least one downstream port is disposed near the rear side edge of the keyboard.

22. The keyboard of claim 15 wherein the cable receiving channel includes a turn changing direction of the cable receiving channel in a generally opposite manner.

23. The keyboard of claim 16 wherein the system interface comprises a Universal Serial Bus hub having a plurality of downstream ports oriented in different directions.

24. A combination of system devices comprising:
a first system device including a system interface hub;
a second system device; and
a cable connecting the second system device to the system interface hub of the first system device,
wherein at least one of the first system device and the second system device includes a cable receiving member for receiving at least a portion of the cable, the cable receiving member capable of receiving a substantial portion of the cable, wherein the cable receiving member comprises at least one channel including a deep channel portion having a sufficient depth for stacking multiple portions of the cable therein, and wherein the length of the cable of the downstream system peripheral device received by the at least one channel is variable by adjusting the stacking of the cable in the deep channel portion.

25. The combination of claim 24 wherein the cable receiving member comprises at least one channel.

26. The combination of claim 24 wherein the system interface hub comprises a Universal Serial Bus hub.

* * * * *